FIXTURE FOR TAPE CARTRIDGES

Filed Oct. 6, 1966

INVENTOR.
WILLIAM F. WOLFNER
BY
Trask, Jenkins & Hanley
ATTORNEYS

United States Patent Office 3,406,923

Patented Oct. 22, 1968

3,406,923

FIXTURE FOR TAPE CARTRIDGES

William F. Wolfner, Columbus, Ind., assignor to Arvin Industries, Inc., Columbus, Ind., a corporation of Indiana Filed Oct. 6, 1966, Ser. No. 584,749

8 Claims. (Cl. 242—55.19)

ABSTRACT OF THE DISCLOSURE

A fixture releasably mounted in a cartridge of the type containing an endless coil of magnetic tape and having a plurality of side walls interconnected by top and bottom walls with one of said side walls having a plurality of access openings across which said tape is driven and the bottom wall having an opening therein adjacent one of said access openings. The fixture is releasably mountable on the cartridge for supporting the tape across said one access opening as for applying electrically conductive spots thereto. Said fixture comprises a base supported against the lower face of the bottom wall over the opening therein and is provided with an L-shaped arm projecting upwardly and outwardly from said base through the opening in the cartridge bottom wall and said one access opening. A vertically extending wall on the outer end of said arm is provided with vertically spaced flanges between which the tape is received and held. Projections are also formed on the base for engagement with the cartridge for releasably mounting the fixture on said cartridge.

This invention relates to a fixture for magnetic tape cartridges, and more particularly to a fixture for use in placing signal spots on magnetic tapes carried in tape cartridges.

One of the types of tape cartridges commercially available comprise a plastic cartridge carrying a spool of endless magnetic tape having a plurality of recorded signal tracks thereon. Such a cartridge is described in G. H. Eash U.S. Patent No. 2,876,005 and is provided with a plurality of openings in one of its side walls. An opening is also provided in the cartridge bottom wall adjacent one of the side wall openings for the reception of a pinch roller for holding a stretch of the tape in driving engagement with a capstan.

In the playing of such tapes, it is frequently desirable to be able to switch the player from one recorded track to another by automatic means. This can be accomplished by placing an electrically conductive spot, i. e. a strip of aluminum, on the tape so that sensing means can be provided on the player for indexing its transducer head from one track to another when the spot on the tape comes in contact with the sensing means. Such an indexing arrangement is described in G. H. Eash U.S. Patent No. 3,009,024.

The magnetic tapes in many such cartridges, however, are not provided with any electrically conductive spots, and because of its extreme flexibility, it is difficult to apply such spots to the tape once it is in the cartridge. It is therefore an object of this invention to provide a fixture for magnetic tape cartridges which will support a cartridge tape in an easily accessible position for applying an electrically conductive spot thereto, which can be easily and quickly mounted on and removed from a tape cartridge and which can be economically manufactured from inexpensive material.

This invention is concerned with a fixture adapted to be mounted on a cartridge of magnetic tape in which said cartridge comprises a plurality of side walls interconnected by top and bottom walls. Said cartridge contains an endless spool of magnetic tape which is guided across a plurality of openings in one of the cartridge side walls.

One of said side wall openings is located adjacent an opening in the cartridge bottom wall through which a pinch roller can project for holding the tape in driving engagement with a capstan.

The preferred form of my fixture comprises a base adapted to be disposed against the cartridge bottom wall and extending across the opening therein. An L-shaped arm projects upwardly and outwardly from the base through the cartridge bottom wall opening with its upper outer end projecting through the cartridge side wall opening located adjacent said bottom wall opening. Guide means are provided on the outer end of said arm for supporting the tape in an easily accessible position so that an electrically conductive spot can be applied thereto. Said arm engages a portion of the edge of said bottom wall opening and means are provided on said base for engaging another portion of said opening for releasably retaining the fixture in operative position on the cartridge.

Other objects and features of the invention will become apparent from the more detailed description which follows and from the accompanying drawings, in which.

Figures 1, 2, 3, 4:
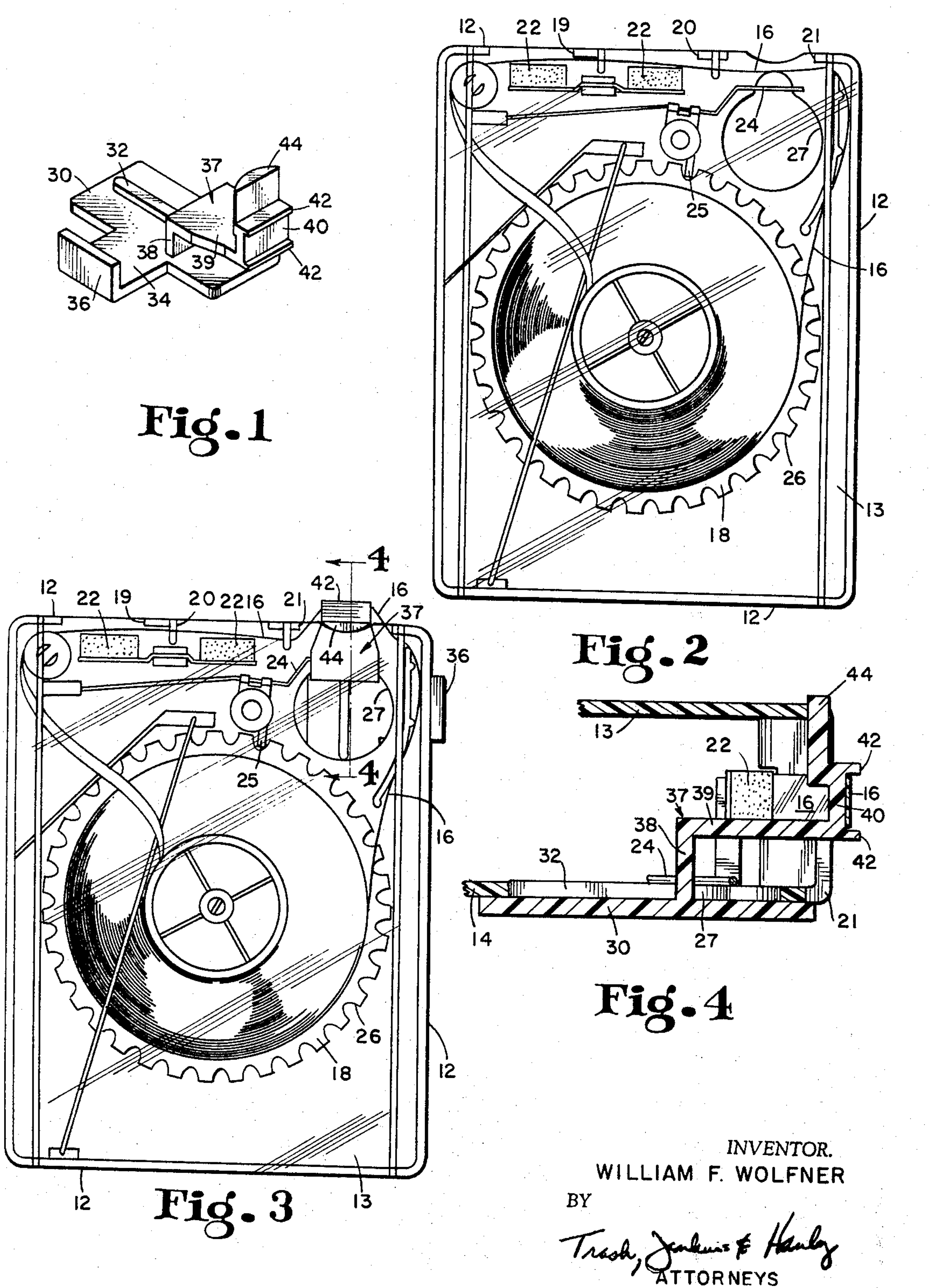
FIG. 1 is a perspective view of a fixture embodying the invention.
FIG. 2 is a plan view of a cartridge with which the fixture shown in FIG. 1 is adapted to be used.
FIG. 3 is a plan view of the cartridge shown in FIG. 2 with the fixture of FIG. 1 shown in operative position thereon.
FIG. 4 is an enlarged vertical section taken on the line 4—4 of FIG. 3.

My fixture is adapted to be used in association with a cartridge of the type shown in FIG. 2 and described in G. H. Eash U.S. Patent No. 2,876,005. Said cartridge comprises a plurality of side walls 12 interconnected by top and bottom walls 13 and 14. A coil of magnetic tape 16 is carried on a spool 18 mounted within the cartridge and is fed to and from said spool past a plurality of openings 19, 20, and 21 formed in one of the cartridge side walls, said tape being maintained adjacent the openings 19 and 20 by pressure pads 22. A lock spring 24 is mounted in the cartridge and is connected to a finger 25 receivable in a plurality of notches 26 in the circumference of spool 18. Said spring extends over a generally circular opening 27 in the cartridge bottom wall adjacent opening 21 for the reception of a pinch roller adapted to hold the tape 16 in driving engagement with a capstan on a player.

My fixture, which is adapted to be mounted on a cartridge of this character, can be conveniently formed as a unitary plastic molding and comprises an elongated base 30 having an upstanding rib 32 on its upper face intermediate the ends thereof. A leg 34 projects laterally from base 30 intermediate the ends of said base and is provided at its outer end with an upturned lip 36.

A generally L-shaped arm 37 is mounted on the upper face of base 30 at the forward end of rib 32 and comprises a vertical stretch 38 connected to a forwardly projecting horizontal stretch 39. The stretch 39 projects forwardly of the base and terminates at its outer end in an upwardly projecting transverse wall 40. A pair of transverse flanges 42 project forwardly from the upper and lower edges of wall 40 and cooperate with said wall to define a transverse guide for supporting the tape 16 in a position of access. A finger 44 projects upwardly from the rearward end of wall 40 for engagement with the cartridge top wall 13 when the fixture is disposed in its operative position.

Thus, to mount the fixture on the cartridge, arm 37 is inserted into the cartridge opening 27 and the fixture is slid forwardly with the forward end of arm stretch 39 projecting outwardly through the cartridge opening 21. Forward sliding movement of the fixture in the cartridge is limited by the vertical arm stretch 38 engaging the forward portion of cartridge opening 27, and after said stretch abuts the forward portion of said opening, a slight additional forward and upward pressure on the fixture will cause the rear end of the base rib 32 to clear the rear edge of said opening and seat thereagainst for thus bindingly retaining the fixture in an operative position in the cartridge. As the fixture is moved into operative position, finger 44 will clear the forward edge of the top wall 13 at opening 21 and will be seated thereagainst to help locate the fixture longitudinally of the cartridge and lip 36 will slide along one of the cartridge side walls to help locate the fixture laterally of said cartridge.

As shown in FIG. 3, with the fixture in its operative position, wall 40 and its flanges 42 will project through opening 21 and the tape stretch extending across said opening will be supported against said wall between said flanges. With the tape supported in this forwardly projecting position, an electrically conductive spot can be easily applied thereto. To remove the fixture from the cartridge, it is merely necessary to pull the rear portion of the fixture downwardly to cause rib 32 to disengage from the rear edge of the cartridge opening 27, whereupon the fixture can be slid rearwardly and downwardly out of said opening.

Although the invention has been discribed for use in applying sensing spots to magnetic tapes in their cartridges, it is to be understood, of course, that it can be mounted on such cartridges to support the tapes for any desired reason or purpose.

I claim:

1. A fixture releasably mountable on a cartridge containing an endless coil of magnetic tape and having a plurality of side walls interconnected by top and bottom walls, one of said side walls having a plurality of access openings across which said tape is driven and said bottom wall having an opening therein adjacent one of said access openings, said fixture comprising a base adapted to be supported against the lower face of said bottom wall over the opening therein, an arm projecting upwardly and outwardly from said base through the opening in said bottom wall and having an outer end adapted to project through said one access opening, guide means on the outer end of said arm for supporting the stretch of tape extending across said one access opening, and means projecting outwardly from said base for releasably mounting the fixture on said cartridge.

2. The invention as set forth in claim 1 in which said guide means comprises a vertically extending wall and a pair of vertically spaced flanges projecting forwardly therefrom.

3. The invention as set forth in claim 1 with the addition that said base is provided with a laterally projecting leg having an upwardly projecting lip adapted to engage another one of said side walls.

4. The invention as set forth in claim 1 in which said means for releasably mounting the fixture on said cartridge comprises a vertical stretch on said arm engageable with the forward edge portion of said bottom wall opening and a rib on said base engageable with the rear edge portion of said bottom wall opening.

5. The invention as set forth in claim 1 with the addition that a lip projects upwardly from said guide means for engagement with said top wall at said one access opening.

6. The invention as set forth in claim 1 in which means are provided on said fixture for locating it laterally and longitudinally of said cartridge.

7. The invention as set forth in claim 6 in which said means comprises a lip interconnected to said base and engageable with a cartridge side wall and a finger interconnected to said arm and engageable with the cartridge top wall.

8. A fixture releasably mountable on a cartridge containing an endless coil of magnetic tape and having a plurality of side walls interconnected by top and bottom walls, one of said side walls having a plurality of access openings across which said tape is driven and said bottom wall having an opening therein adjacent one of said access openings, said fixture comprising a base adapted to be supported against the lower face of said bottom wall over the opening therein, an L-shaped arm projecting upwardly and outwardly from said base through the opening in said bottom wall and said one access opening, a vertically extending wall at the outer end of said arm having a pair of forwardly projecting, vertically spaced flanges between which said tape is receivable, and said arm having a vertical stretch engageable with the forward edge portion of said bottom wall opening and said base having a rib engageable with the rear edge portion of said bottom wall opening for mounting the fixture on said cartridge.

References Cited

UNITED STATES PATENTS

| | | | |
|---|---|---|---|
| 2,853,923 | 9/1958 | Daniel | 242—55.19 XR |
| 3,088,687 | 5/1963 | Martin | 242—55.19 |
| 3,243,134 | 3/1966 | Reed et al. | 242—55.19 |

BILLY S. TAYLOR, *Primary Examiner.*